(12) United States Patent
Miyauchi et al.

(10) Patent No.: US 8,369,048 B2
(45) Date of Patent: Feb. 5, 2013

(54) CPP-TYPE THIN FILM MAGNETIC HEAD PROVIDED WITH SIDE SHIELDS INCLUDING A PAIR OF ANTIMAGNETICALLY EXCHANGED-COUPLED SIDE SHIELD MAGNETIC LAYERS

(75) Inventors: Daisuke Miyauchi, Tokyo (JP); Keita Kawamori, Tokyo (JP); Takahiko Machita, Tokyo (JP)

(73) Assignee: TDK Corporation, Tokyo (JP)

( * ) Notice: Subject to any disclaimer, the term of this patent is extended or adjusted under 35 U.S.C. 154(b) by 322 days.

(21) Appl. No.: 12/461,976

(22) Filed: Aug. 31, 2009

(65) Prior Publication Data

US 2011/0051291 A1    Mar. 3, 2011

(51) Int. Cl.
*G11B 5/33* (2006.01)
(52) U.S. Cl. ............................................. 360/319
(58) Field of Classification Search .................. 360/319
See application file for complete search history.

(56) References Cited

U.S. PATENT DOCUMENTS

| | | | | |
|---|---|---|---|---|
| 6,967,823 | B2* | 11/2005 | Nakamoto et al. | 360/319 |
| 7,158,351 | B2* | 1/2007 | Nakamoto et al. | 360/319 |
| 2005/0157431 | A1* | 7/2005 | Hatatani et al. | 360/319 |
| 2005/0264948 | A1* | 12/2005 | Nakamoto et al. | 360/319 |
| 2008/0043370 | A1 | 2/2008 | Hirata et al. | |
| 2009/0034132 | A1 | 2/2009 | Miyauchi et al. | |
| 2009/0135529 | A1 | 5/2009 | Shimazawa et al. | |

FOREIGN PATENT DOCUMENTS

JP    A-2007-109807    4/2007

* cited by examiner

*Primary Examiner* — David D Davis
(74) *Attorney, Agent, or Firm* — Posz Law Group, PLC

(57) ABSTRACT

A thin film magnetic head includes a magnetoresistive (MR) stack disposed between first and second shield layers in a direction orthogonal to the film surface; a first exchange-coupling layer that is positioned between the MR stack and the first shield layer; a second exchange-coupling layer that is positioned between the MR stack and the second shield layer; a bias magnetic field application layer that is disposed at an opposite surface of the MR stack from an air bearing surface (ABS); and pair of side shield layers that are positioned at both sides of the MR stack with respect to a track width direction. Each of the side shield layers includes a pair of magnetic layers that are antiferromagnetically exchange-coupled through a side shield ruthenium layer.

12 Claims, 9 Drawing Sheets

CPP-TYPE THIN FILM MAGNETIC HEAD PROVIDED WITH SIDE SHIELDS INCLUDING A PAIR OF ANTIMAGNETICALLY EXCHANGED-COUPLED SIDE SHIELD MAGNETIC LAYERS

BACKGROUND OF THE INVENTION

1. Field of the Invention

The present invention relates to a thin film magnetic head. Specifically, it relates to the composition of a side shield (or side shield layer) of the thin film magnetic head provided with a pair of magnetic layers whose magnetization directions change according to an external magnetic field.

2. Description of the Related Art

Conventionally, a spin valve head is known as a head having high power and high sensitivity, used for a hard disk drive (HDD). In order to fix a magnetization direction of one ferromagnetic layer of a pair of ferromagnetic layers that are disposed on both sides of a nonmagnetic intermediate layer, an antiferromagnetic layer made of a material such as IrMn is used for the spin valve head. Since the antiferromagnetic layer has a relatively thicker film thickness, and may cause a restriction of further high recording density (narrowing a read gap), a new concept attempts to narrow a read gap. In this specification, the read gap means a gap between upper and lower shield layers.

A thin film magnetic head is disclosed in the specification of U.S. Patent Publication No. 2009/0034132. The thin film magnetic head has two free layers whose magnetization directions change according to an external magnetic field, and a nonmagnetic intermediate layer that is sandwiched by the two free layers. In this specification, a magnetoresistive (MR) element having the above-described configuration may be indicated as dual free layers (DFL). The two free layers are exchange-coupled based on RKKY (Rudermann, Kittel, Kasuya, Yoshida) interaction through the nonmagnetic intermediate layer. The two free layers are magnetized in antiparallel directions to each other under the state that a magnetic field is not applied at all. In this specification, antiparallel direction means that magnetization directions are parallel but opposed to each other. A bias magnetic layer is disposed on rear sides of the two free layers, seen from an air bearing surface (ABS), and a bias magnetic field is applied in an orthogonal direction to the ABS. Magnetization directions of the two free layers form a certain relative angle by the magnetic field generated from the bias magnetic layer. Under this state, when an external magnetic field, which is in an orthogonal direction to the ABS, is applied from a recording medium, the magnetization directions of the two free layers change, the relative angle between the magnetization directions of the two free layers changes, and an electrical resistance of a sense current changes. Therefore, the external magnetic field may be detected by using the above-described property.

Since the film configuration configured with the two free layers needs no antiferromagnetic layer, the film configuration is simplified. As a result, it becomes easier to narrow the read gap. In the document, side shield layers including NiFe are disposed on both sides of each of the two free layers in a track width direction, and it is considered to reduce an influence of a magnetic field generated from adjacent tracks. Even if an element size is the same, the side shield layers may narrow an effective track width. In order to obtain the high recording density of a hard disk drive (HDD), it is required not only to increase a recording density in a circumferential direction of a truck (a linear recording density), but also to increase an arrangement density in a diametral direction of the track (a track density). It can be said that the invention, which is disclosed in the document, effectively functions to increase both the recording and arrangement densities, and that the invention indicates one of the ideal configurations to obtain the HDD high recording density in the future.

Meanwhile, a side shield layer has a height that is almost identical to heights (depth of the free layer measured in an orthogonal direction to the surface of ABS) of the two free layers. In order to improve a response according to the external magnetic field, the height of the free layer is formed as small as possible. Therefore, the height of the side shield layer that is adjacent to the free layer is formed small, and the side shield layer is generally formed in a long and narrow shape in the track width direction. The side shield layer having such a long and narrow shape tends to be magnetized in a lengthwise direction of the long and narrow shape by a shape anisotropy effect. When the side shield layer is magnetized, not only the bias magnetic field generated from the bias magnetic layer but also a magnetic field generated from the side shield layer are applied to the free layer. Since the conventional side shield layer is mainly formed by NiFe, the side shield layer easily absorbs the bias magnetic field generated from the bias magnetic layer, and is magnetized. It is ideal that a direction of the bias magnetic field, the direction added to the free layer, is in the orthogonal direction to the ABS. However, when the side shield layer applies the magnetic field to the free layer, a similar phenomenon occurs in a case where the direction of this bias magnetic field substantially inclines in the orthogonal direction to the ABS. This phenomenon deteriorates linearity between the external magnetic field and a signal output at the time of the external magnetic field being applied, and further increases a dispersion of the output.

SUMMARY OF THE INVENTION

The present invention relates to a thin film magnetic head disposed with a magnetoresistive (MR) stack having a first MR magnetic layer, a second MR magnetic layer, and a nonmagnetic intermediate layer. Magnetization directions of the first and second MR magnetic layers change according to an external magnetic field. The nonmagnetic intermediate layer is disposed between the first MR magnetic layer and the second MR magnetic layer and contacts the both layers. The object of the present invention is to provide the thin film magnetic head with such a configuration. A track density of the head easily increases, and linearity between the external magnetic field and a signal output is improved.

A thin film magnetic head of the present invention includes first and second shield layers that are positioned on both sides of an MR stack with respect to a film surface orthogonal direction, and that function as electrodes flowing a sense current to the MR stack in the film surface orthogonal direction, the first shield layer facing a first magnetoresistive (MR) magnetic layer, and having a first magnetic control layer disposed at a surface where the first shield layer faces the first MR magnetic layer, the first magnetic control layer having a magnetization direction fixed to a first direction that is parallel to an air bearing surface (ABS), the second shield layer facing a second magnetoresistive (MR) magnetic layer, and having a second magnetic control layer disposed at a surface where the second shield layer faces the second MR magnetic layer, a second magnetic control layer having a magnetization direction fixed to another direction that is antiparallel to the first direction, a first exchange-coupling layer that is positioned between the first MR magnetic layer and the first magnetic control layer, and that generates an exchange-coupling between the first MR magnetic layer and the first magnetic control layer; a second exchange-coupling layer that is positioned between the second MR magnetic layer and the second magnetic control layer, and that generates an exchange-coupling between the second MR magnetic layer and the second magnetic control layer, a bias magnetic field application layer that is disposed at an opposite surface of the MR stack from the ABS, and that applies a bias magnetic field to the MR stack in a direction orthogonal to the ABS; and a pair of side shield layers that are positioned at both sides of the MR stack with respect to a track width direction. Each of the side shield layers includes a pair of magnetic layers that are antiferromagnetically exchange-coupled through a side shield ruthenium (Ru) layer.

In the thin film magnetic head having the above-mentioned configuration, the first and second MR magnetic layers are magnetized in antiparallel directions to each other by the magnetic fields generated from the first magnetic control layer of the first shield layer and the second magnetic control layer of the second shield layer where there is no additional magnetic field. Since the first and second MR magnetic layers actually receive the bias magnetic field, being in the orthogonal direction to the ABS and generated from the bias magnetic field application layer, the first and second MR magnetic layers are magnetized into an intermediate state defined as a half-parallel state and a half-antiparallel state. The middle state is defined as an initial magnetization state. When the recording medium applies the external magnetic field under the initial magnetization state, a relative angle formed by the magnetization directions of the first and second MR magnetic layers changes according to a size (or amount) and a direction of the external magnetic field. Therefore, it becomes possible to detect the external magnetic field using a magnetoresistive effect.

An influence of a magnetic field from an adjacent track is suppressed by a pair of the side shield layers disposed in the both sides of the MR stack in the track width direction. Therefore, the track density easily increases. Because each of a pair of side shield layers has a pair of magnetic layers that are antiferromagnetically exchange-coupled through a Ru layer (or side shield Ru layer), each of the side shield layers has little spontaneous magnetization as a whole. As mentioned above, each of the side shield layers generally has a long and narrow shape in the track width direction, and is easily magnetized in the track width by the shape anisotropy effect if each of the side shields has spontaneous magnetization. However, according to the present invention, even if spontaneous magnetization is generated in one side of the magnetic layers that configure each of the side shields, the generated magnetization is canceled because of the magnetization generated in the other side of the magnetic layer by the exchange-coupling. Therefore, the side shield layers are minimally magnetized as a whole. As a result, the first and second MR magnetic layers easily receive only the bias magnetic field in the orthogonal direction to the ABS. Therefore, it becomes possible to provide a thin film magnetic head that has increased arrangement density in the circumferential direction of the track and improved linearity between the external magnetic field and the signal output.

The above-mentioned object, as well as other objects, characteristics, and advantages of the present invention will be described below in more detail with reference to attached drawings illustrating an embodiment(s) of the present invention.

DETAILED DESCRIPTION OF THE INVENTION

Figure 1:
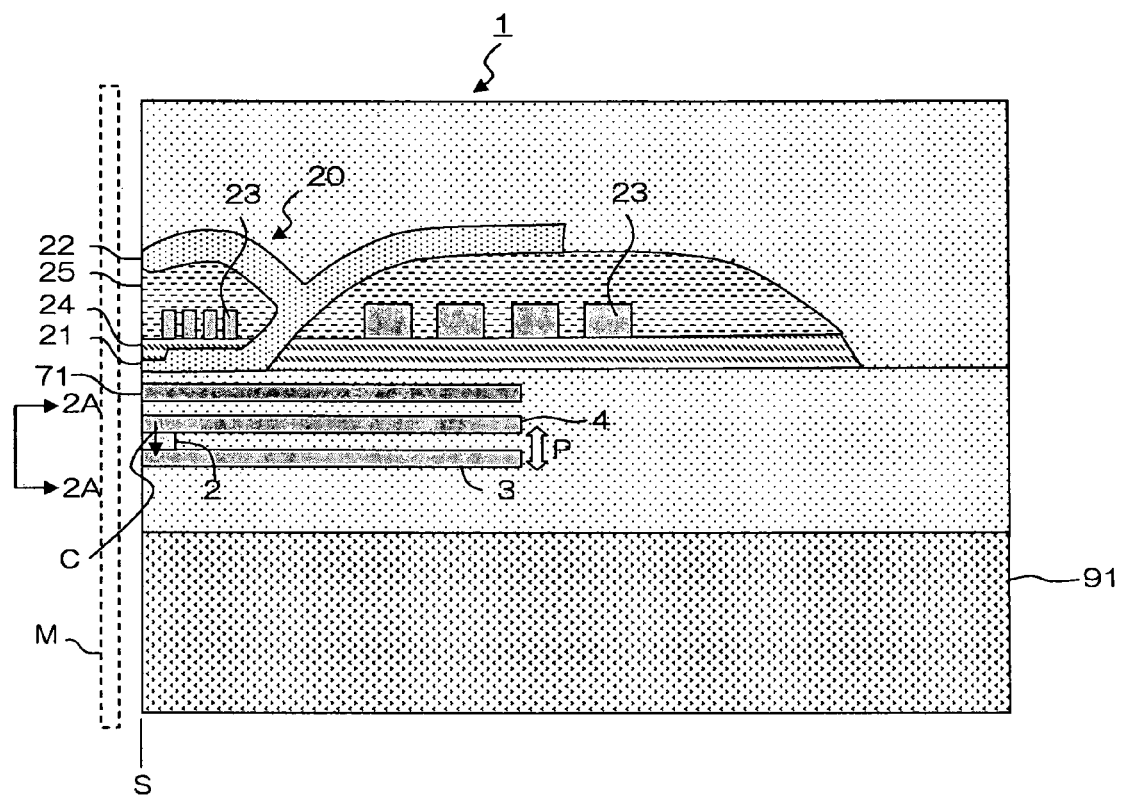
FIG. 1 is a side sectional view of the thin film magnetic head according to one embodiment of the present invention.
Figure 2A:
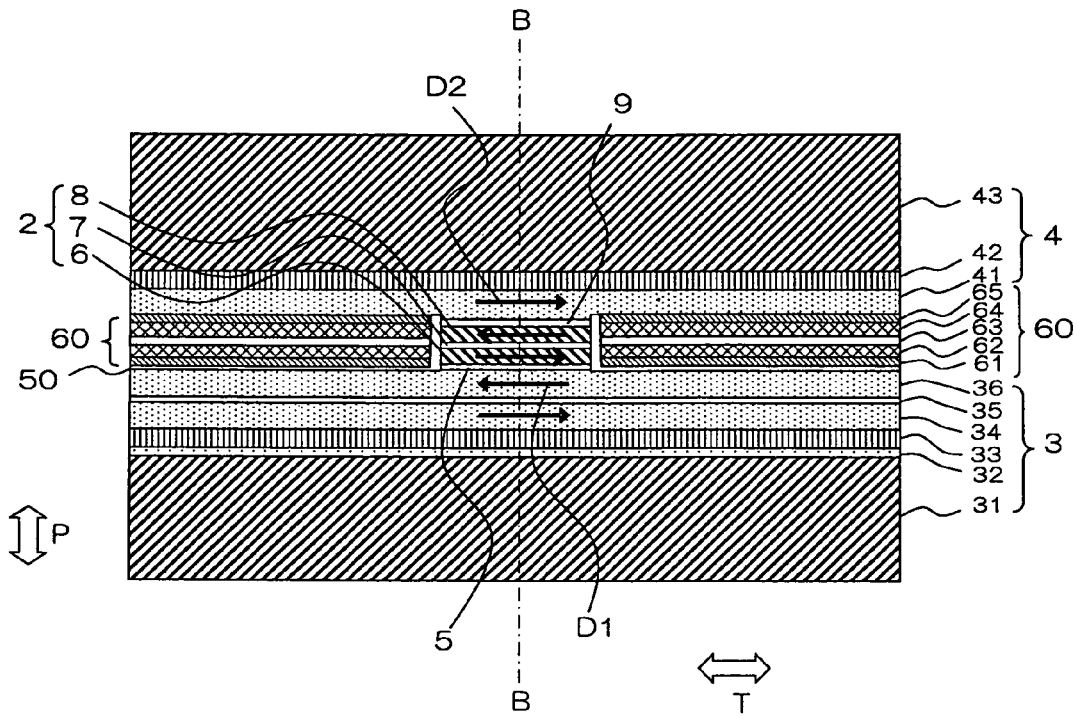
FIG. 2A is a side view of the reproducing element part of the thin film magnetic head seen from the 2A-2A direction in FIG. 1.
Figure 2B:
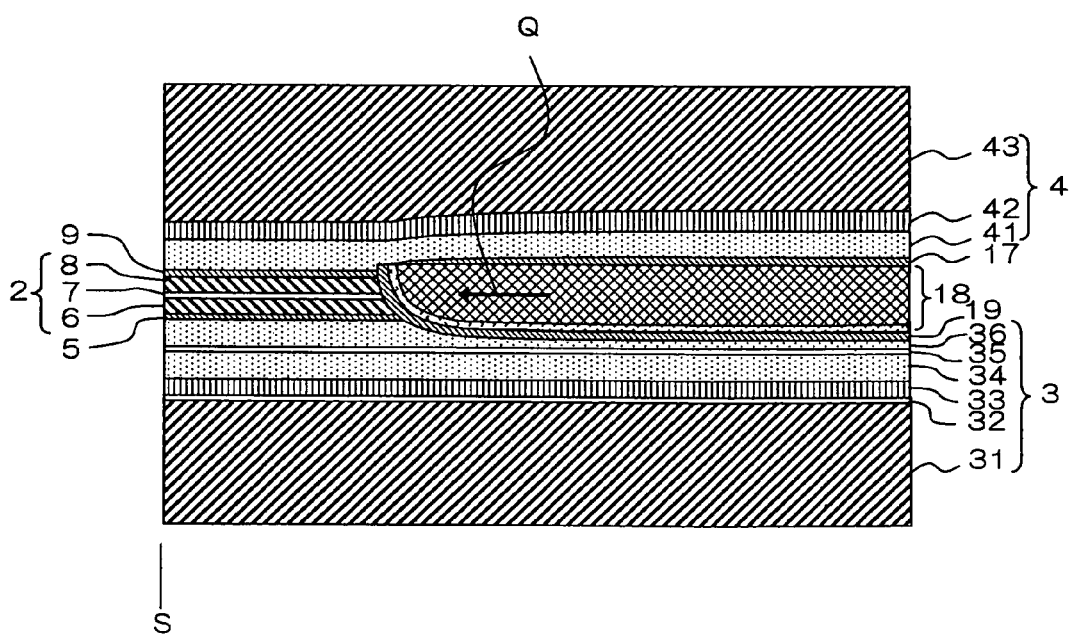
FIG. 2B is a sectional view of the reproducing element part of the thin film magnetic head seen from the same direction as FIG. 1 is shown.

Hereafter, a thin film magnetic head according to one embodiment of the present invention will be explained with reference to the drawings. FIG. 1 is a side sectional view of the thin film magnetic head according to the present invention. FIG. 2A is a side view of the reproducing element part of the thin film magnetic head seen from the 2A-2A direction, i.e., from an air bearing surface (ABS) S, in FIG. 1. FIG. 2B is a sectional view of the reproducing element part of the thin film magnetic head seen from the same direction as FIG. 1 is shown. The ABS S is a surface of a thin film magnetic head 1 on a side facing a recording medium M.

The thin film magnetic head 1 includes a magnetoresistive (MR) stack 2 and first and second shield layers 3 and 4 that sandwich the MR stack 2 in a film surface orthogonal direction P of the MR stack 2. The thin film magnetic head 1 is a current perpendicular to plane (CPP) type in which a sense current flows in the film surface orthogonal direction P of the MR stack 2. Table 1 shows film configurations of the MR stack 2 and the first and second shield layers 3 and 4, i.e., the film configurations taken along line B-B of FIG. 2A. The table shows layers in a bottom up direction and in a laminated order that is from the first shield layer 3 to the second shield layer 4.

TABLE 1

| | Layer Configuration | Composition | Film Thickness (nm) |
|---|---|---|---|
| Second Shield Layer 4 | Second Shield Main Layer 43 | NiFe | 1000~2000 |
| | Second Antiferromagnetic Layer 42 | IrMn | 1 |
| | Second Magnetic Control Layer 41 | $Co_{90}Fe_{10}$ | 1 |

TABLE 1-continued

| | Layer Configuration | Composition | Film Thickness (nm) |
|---|---|---|---|
| | Second Exchange-Coupling Layer 9 | Ru | 0.8 |
| MR Stack 2 | Second MR Magnetic Layer 8 | NiFe | 3 |
| | | CoFeB | 1 |
| | | $Co_{30}Fe_{70}$ | 1 |
| | Nonmagnetic Intermediate Layer 7 | MgO | 3 |
| | First MR Magnetic Layer 6 | $Co_{30}Fe_{70}$ | 1 |
| | | CoFeB | 1 |
| | | NiFe | 3 |
| | First Exchange-Coupling Layer 5 | Ru | 0.8 |
| First Shield Layer 3 | First Magnetic Control Layer 36 | $Co_{90}Fe_{10}$ | 1 |
| | | NiFe | 8 |
| | | $Co_{90}Fe_{10}$ | 1 |
| | Ru Layer 35 | Ru | 0.8 |
| | Intermediate Magnetic Layer 34 | $Co_{90}Fe_{10}$ | 1 |
| | | NiFe | 8 |
| | | $Co_{90}Fe_{10}$ | 1 |
| | First Antiferromagnetic Layer 33 | IrMn | 7 |
| | Buffer Layer 32 | Ru | 2 |
| | | Ta | 1 |
| | First Shield Main Layer 31 | NiFe | 1000~2000 |

Referring to FIG. 2A and Table 1, the MR stack 2 includes a first MR magnetic layer 6 whose magnetization direction changes according to an external magnetic field, a nonmagnetic intermediate layer 7, and a second MR magnetic layer 8 whose magnetization direction changes according to the external magnetic field. The nonmagnetic intermediate layer 7 is disposed between the first MR magnetic layer 6 and the second MR magnetic layer 8 in contacting with both layers. A first exchange-coupling layer 5 is adjacently disposed to the first MR magnetic layer 6. The second exchange-coupling layer 9 is adjacently disposed to the second MR magnetic layer 8.

The first MR magnetic layer 6 is configured from NiFe/CoFeB/CoFe layers. The nonmagnetic intermediate layer 7 is configured from an MgO layer. The second MR magnetic layer is configured from CoFe/CoFeB/NiFe layers. In the specification, the designations A/B/C . . . indicate that the films A, B, C, and . . . are laminated in bottom up direction in this order. The first MR magnetic layer 6 and the second MR magnetic layer 8 may be formed of NiFe or CoFeB. The nonmagnetic intermediate layer 7 may be formed by materials such as ZnO, $Al_2O_3$, AlN, $TiO_2$, or Ni. When a metal or semiconductor made of, for example, ZnO is used for the nonmagnetic intermediate layer 7, the thin film magnetic head 1 functions as a current perpendicular to plane-giant magneto-resistance (CPP-GMR) element. When an insulator made of, for example, MgO is used, the thin film magnetic head 1 functions as a tunneling magneto-resistance (TMR) element.

The first exchange-coupling layer 5 is disposed between the first MR magnetic layer 6 and the first magnetic control layer 36 of the first shield layer 3. The first exchange-coupling layer 5 generates a negative exchange-coupling between the first magnetic control layer 36 and the first MR magnetic layer 6. The first exchange-coupling layer 5 is a Ru layer with 0.8 nm in a film thickness in this embodiment. However, the first exchange-coupling layer 5 may be configured with other film configurations such that at least one Ru layer with the film thickness of 0.8 nm is inserted into a magnetic layer made of, for example, a CoFe layer. For example, the film configuration may be a CoFe layer/Ru layer/CoFe layer, a CoFe layer/Ru layer/CoFe layer/Ru layer/CoFe layer, or the like. With the above mentioned film configuration, because the magnetic layers are negatively exchange-coupled, adjacently disposed and sandwich the Ru layer, the exchange magnetic field generated in the first exchange-coupling layer 5 is continuously transferred to each of the adjacent magnetic layers by reversing the magnetization direction back and forth. As a result, the exchange-coupling is generated between the first magnetic control layer 36 and the first MR magnetic layer 6. The above mentioned layer configuration is effective when it is necessary to set the width of the read gap within a predetermined width.

Similarly, the second exchange-coupling layer 9 is disposed between the second MR magnetic layer 8 and the second magnetic control layer 41 of the second shield layer 4, and generates a negative exchange-coupling between the second magnetic control layer 41 and the second MR magnetic layer 8. The second exchange-coupling layer 9 is configured with a Ru layer with 0.8 nm in a film thickness in this embodiment. However, as with the first exchange-coupling layer 5, the second exchange-coupling layer 9 may be configured with a film configuration where at least one Ru layer with a film thickness of 0.8 nm is inserted into a magnetic layer made of, such as, a CoFe layer. The number of inserted Ru layers is necessary to be set so that the magnetization direction of the first MR magnetic layer 6 is antiparallel to the magnetization direction of the second MR magnetic layer 8 under the state that the bias magnetic field and the external magnetic field are not applied (in other words, when neither the bias magnetic field nor the external magnetic field are applied). For example, when the layer configurations of the first exchange-coupling layer 5 and the second exchange-coupling layer 9 are both three layered configurations, a Ru layer/CoFe layer/Ru layer may be applicable. When the layer configurations of the first exchange-coupling layer 5 and the second exchange-coupling layer 9 are both five layered configurations, a Ru layer/CoFe layer/Ru layer/CoFe layer/Ru layer may be applicable. In addition, in order to narrow the read gap, it is preferred that both the first exchange-coupling layer 5 and the second exchange coupling layer 9 are configured with the Ru layer having a film thickness of 0.8 nm. According to Table 1, the width of the read gap configured with the configuration is 14.6 nm, which is an extremely small value.

The first shield layer 3 and the second shield layer 4 act as electrodes that apply the sense current C in the film surface orthogonal direction P of the MR stack 2. The first shield layer 3 is a lower shield that is positioned facing the first MR magnetic layer 6, and the second shield layer 4 is an upper shield that is positioned facing the second MR magnetic layer 8.

The first shield layer 3 has a first shield main layer 31 made of NiFe, a first antiferromagnetic layer 33, and an intermediate magnetic layer 34 exchange-coupled with the first antiferromagnetic layer 33, the first magnetic control layer 36 that is mentioned above and positioned facing the first MR magnetic layer 6. The first antiferromagnetic layer 33 is positioned above the first shield main layer 31 through a buffer layer 32, and is made of IrMn. A ruthenium (Ru) layer 35, having the film thickness of 0.8 nm, is disposed between the intermediate magnetic layer 34 and the first magnetic control layer 36, and generates negative exchange-coupling between the intermediate magnetic layer 34 and the first magnetic control layer 36.

The second shield layer 4 has a second shield main layer 43 made of NiFe, a second antiferromagnetic layer 42, and the second magnetic control layer 41. The second antiferromagnetic layer 42 is positioned under the second shield main layer 43 and is made of IrMn. The second magnetic control layer 41, mentioned above, is positioned facing the second MR magnetic layer 8. The second magnetic control layer 41 and the second antiferromagnetic layer 42 are exchange-coupled so that the magnetization direction of the second magnetic control layer 41 is fixed in an antiparallel direction D2 that is opposite to the magnetized direction of the first magnetic control layer 36 (the first direction D1). The first direction D1 is parallel with ABS S, and is parallel with a film surface of the first magnetic control layer 36. The first antiferromagnetic layer 33 and the second antiferromagnetic layer 42 may be formed of an alloy, such as IrMn, Fe—Mn, Ni—Mn, Pt—Mn, or Pd—Pt—Mn, and may be formed of a combination including the above alloys.

As described above, the magnetization directions of the second magnetic control layer 41 and the first magnetic control layer 36 are antiparallel so that the width of the read gap is minimized with a configuration in which each of the first exchange-coupling layer 5 and the second exchange coupling layer 9 has the Ru layer having a film thickness of 0.8 nm. Specifically, in order to perform as a reproducing element, it is necessary that the magnetization direction of the first MR magnetic layer 6 and the magnetization direction of the second MR magnetic layer 8 be antiparallel under the state that the bias magnetic field and the external magnetic field are not applied. When the magnetization directions of the first magnetic control layer 36 and the second magnetic control layer 41 are fixed in an antiparallel direction to each other, it become possible that both the first exchange-coupling layer 5 and the second exchange coupling layer 9 are configured with the Ru layer having a film thickness of 0.8 nm.

Each of the magnetization directions of the first magnetic control layer 36 and second magnetic control layer 41 are determined by the magnetization directions of the first antiferromagnetic layer 33 and the second antiferromagnetic layer 42, respectively. On the other hand, the magnetization directions of the first antiferromagnetic layer 33 and the second antiferromagnetic layer 42 are determined by a direction of a magnetic field during a heat treatment process in a magnetic field. Therefore, the magnetization directions of the first antiferromagnetic layer 33 and the second antiferromagnetic layer 42 are preferably arranged in the same direction in view of the manufacturing processes. Accordingly, the intermediate magnetic layer 34 is disposed between the first antiferromagnetic layer 33 and the first magnetic control layer 36, and negative exchange-coupling is generated between the intermediate magnetic layer 34 and the first magnetic control layer 36. With the above configuration, it is realized that the magnetization directions of the first antiferromagnetic layer 33 and the second antiferromagnetic layer 42 are arranged in the same direction, and that the magnetization directions of the first magnetic control layer 36 and the second magnetic control layer 41 are in an antiparallel direction to each other. Additionally, it is apparent that, when the intermediate magnetic layer 34 is disposed between the second antiferromagnetic layer 42 and the second magnetic control layer 41, a similar effect may be obtained.

As shown in FIG. 2B, on the opposite surface from the ABS S of the MR stack 2, a bias magnetic field application layer 18 is disposed through an insulating layer 19 made of $Al_2O_3$. The bias magnetic field application layer 18 is a hard magnetic layer made of a Cr layer/CoPt layer, and the CoPt layer mainly applies a bias magnetic field in an orthogonal direction Q to the ABS S to the MR stack 2. The bias magnetic field application layer 18 may be formed of CoCrPt. The insulating layer 19 prevents the sense current from flowing into the bias magnetic field application layer 18. It is preferred to dispose a cap layer 17 made of Cr on the bias magnetic field application layer 18.

Referring again to FIG. 2A, insulating layers 50, made of $Al_2O_3$, are formed on the both sides of the MR stack 2 in the track width T. With the insulating layers 50 the sense current flowing along the film surface orthogonal direction P concentrates in the MR stack 2. A pair of side shield layers 60 are positioned on both sides of the MR stack 2 in the track width T through the insulating layers 50. Table 2 shows a layer configuration of the side shield layer.

TABLE 2

| Layer Configuration | | Composition | Film Thickness (nm) |
|---|---|---|---|
| Side Shield Layer 60 | Cap Layer 65 | CrTi | 3 |
| | Second Side Shield Magnetic Layer 64 | NiFe | 5 |
| | | CoFe | 1 |
| | Side Shield Ru Layer 63 | Ru | 0.8 |
| | First Side Shield Magnetic Layer 62 | CoFe | 1 |
| | | NiFe | 5 |
| | Under Layer 61 | CrTi | 3 |
| Insulating Layer 50 | | $Al_2O_3$ | 5 |

Each of the pair of side shield layers 60 has a pair of side shield magnetic layers 62 and 64 that are antiferromagnetically exchange-coupled through a side shield Ru layer 63. Specifically, as shown in FIG. 2B and Table 2, the first side shield magnetic layer 62, made of a NiFe layer/CoFe layer, is layered on the insulating layer 50 through an under layer 61, and the second side shield magnetic layer 64, made of a NiFe layer/CoFe layer, is layered through the side shield Ru layer 63. A cap layer 65 is provided on the second side shield magnetic layer 64. CoFe layers are disposed on the both sides of the side shield Ru layer 63 so that the exchange-coupling force generated by the side shield Ru layer 63 is strengthened. Particularly, a composition of 90Co10Fe is preferred. CrTi, Ru, Cr, NiCr or the like may be used as materials of the under layer 61 and the cap layer 65. An amorphous metal layer such as CoZrTa instead of the NiFe layer may be used for the first side shield magnetic layer 62 and the second side shield magnetic layer 64. Using the amorphous metal layer may restrain a dispersion of electromagnetic conversion characteristic caused by a dispersion of particles among elements.

According to the above-mentioned configuration, the side shield layer 60 has a synthetic structure that uses exchange-coupling through the Ru layer. Even if one of the side shield magnetic layers 62 and 64 generates a spontaneous magnetization, the other of the side shield magnetic layers 62 and 64 also generates a magnetization by exchange-coupling so that these magnetizations cancel each other. As a result, the magnetization of the side shield layer 60 as whole is effectively suppressed. Since the side shield layer 60 having the synthetic structure does not cause a magnetization inversion due to a magnetic wall movement, it may not become a noise source. On the other hand, since excess magnetic flux can be absorbed by a small angle of magnetization rotation, the effective track width may be narrowed.

Figure 3A:
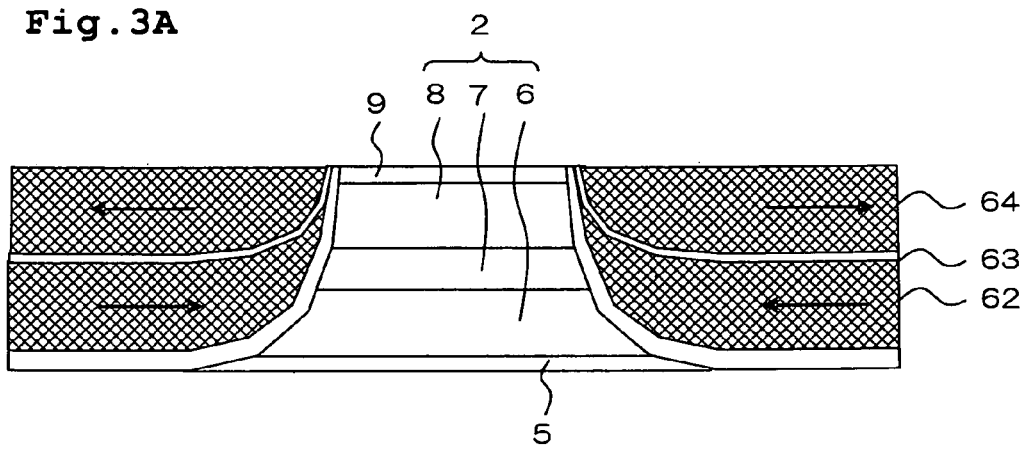
FIGS. 3A and 3B are schematic views of the side shield layers according to two embodiments.
Figure 3B:
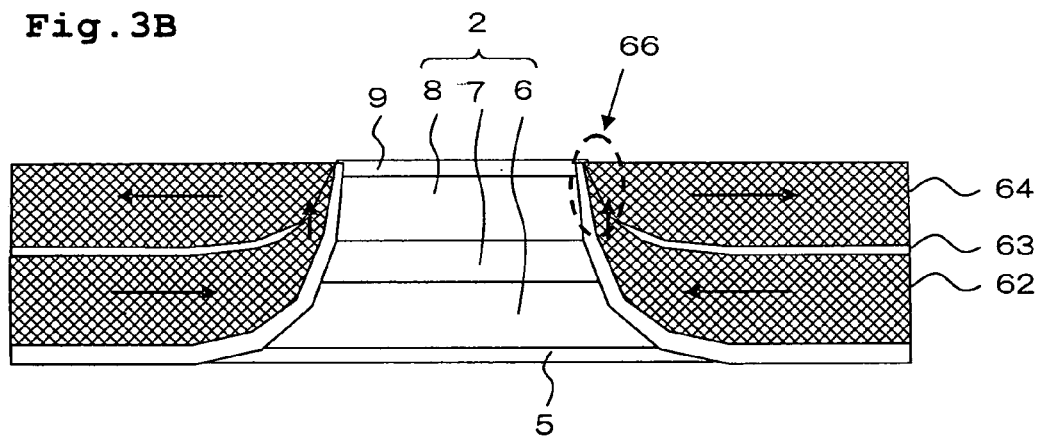

It is preferred that the pair of the side shield magnetic layers 62 and 64 directly contact each other without the intervening side shield Ru layer 63 in a vicinity of the MR stack 2 (namely, where the side shield Ru layer 63 is not present). FIG. 3A shows a layer configuration that the side shield Ru layer 63 extends to the vicinity of the MR stack 2, and the side shield magnetic layers 62 and 64 are disposed without directly contacting each other. On the other hand, FIG. 3B shows another layer configuration that the side shield Ru layer 63 is absent in the vicinity of the MR stack 2, and the side shield magnetic layers 62 and 64 are provided directly contacting each other in the vicinity of the MR stack 2. As shown in the drawings, it should be noted that the actual MR stack 2 has a cross sectional trapezoidal shape that has a narrow upper part, a wider lower part, and inclined side slopes.

In the configuration shown in FIG. 3B, even if the side shield magnetic layers 62 and 64 have spontaneous magnetization, the magnetic flux flows (shown as arrows in the figure) inside the side shield magnetic layers 62 and 64 are linked in a U-shaped pattern through contacting parts 66 of the side shield magnetic layers 62 and 64. Therefore, the magnetic field is less likely applied to the MR stack 2. A Ru layer having a layer thickness of approximately 0.8 nm generates a strong negative exchange-coupling force. However, it has known that a Ru layer having a layer thickness of approximately 0.6 nm conversely generates a positive exchange-coupling force. Since the MR stack 2 has a cross sectional trapezoidal shape, it is difficult to form the Ru layers in preferred thicknesses in the inclined side slopes with a high degree of accuracy. Therefore, a Ru layer having a layer thickness of approximately 0.8 nm may not be formed along the inclined side slopes of the MR stack 2, resulting in failure to obtain a strong negative exchange-coupling force. With the configuration shown in FIG. 3B, since the Ru layer is not formed along the inclined surface of the MR stack 2 (or the range to be formed is restricted), the possibility described above is readily eliminated, and the reliability of the head is increased. The methods for producing the above-mentioned film configuration will be explained later.

Referring to FIG. 1, a writing part 20 is disposed on the second shield layer 4 through an interelement shield layer 71 formed by, for example, a sputtering method. The writing part 20 has a configuration for the so-called perpendicular magnetic recording. A magnetic pole layer for writing is configured with a main magnetic pole layer 21 and an auxiliary magnetic pole layer 22. These magnetic pole layers 21 and 22 are formed by a frame plating method or the like. The main magnetic pole layer 21 is made of FeCo, and is exposed in a direction that is almost orthogonal to the ABS S. A coil layer 23 is wound around the main magnetic pole layer 21, and extends over a gap layer 24 that is made of an insulating material. The magnetic flux is induced to the main magnetic pole layer 21 by the coil layer 23. The coil layer 23 is formed by a frame plating method or the like. The magnetic flux is guided through the inside of the main magnetic pole layer 21 and is emitted toward the recording medium from the ABS S. The main magnetic pole layer 21 is narrowed near the ABS S not only in the film surface orthogonal direction P but also in the track width direction T (a direction that is orthogonal to the paper surface of FIG. 1; see FIG. 2 as well). Therefore, it generates a minute and strong writing magnetic field that is suitable for high recording density.

The auxiliary magnetic pole layer 22 is a magnetic layer that is magnetically connected with the main magnetic pole layer 21. The auxiliary magnetic pole layer 22 is a magnetic pole layer with a layer thickness of approximately 0.01 to 0.5 μm and is formed by an alloy that is made of, for example, either two or three of the following materials: Ni; Fe; and Co. The auxiliary magnetic pole layer 22 is branched from the main magnetic pole layer 21 and faces the main magnetic pole layer 21 through a gap layer 24 and a coil insulating layer 25 on the ABS S side. The edge portion of the auxiliary magnetic pole layer 22 on the side of the ABS S forms a trailing shield part of which the layer cross section (area) in the edge portion is larger than other portions of the auxiliary magnetic pole layer 22. Because the auxiliary magnetic pole layer 22 is disposed in this manner, the magnetic field gradient between the auxiliary magnetic pole layer 22 and the main magnetic pole layer 21 becomes steeper in the vicinity of the ABS S. As a result, signal output jitter is small, and error rate of reading is small.

Next, an operation principle that the thin film magnetic head reads magnetic information recorded on the recording medium is explained below. As by arrows shown in FIG. 2A, the intermediate magnetic layer 34 is magnetized in a right-pointing direction in the figure by exchange-coupling with the first antiferromagnetic layer 33. The first magnetic control layer 36 is magnetized in a lift-pointing direction (the direction D1) in the figure by exchange-coupling with the intermediate magnetic layer 34. Similarly, the second magnetic control layer 41 is magnetized in the right-pointing direction (the direction D2) in the figure by exchange-coupling with the second antiferromagnetic layer 42.

Figure 4A:
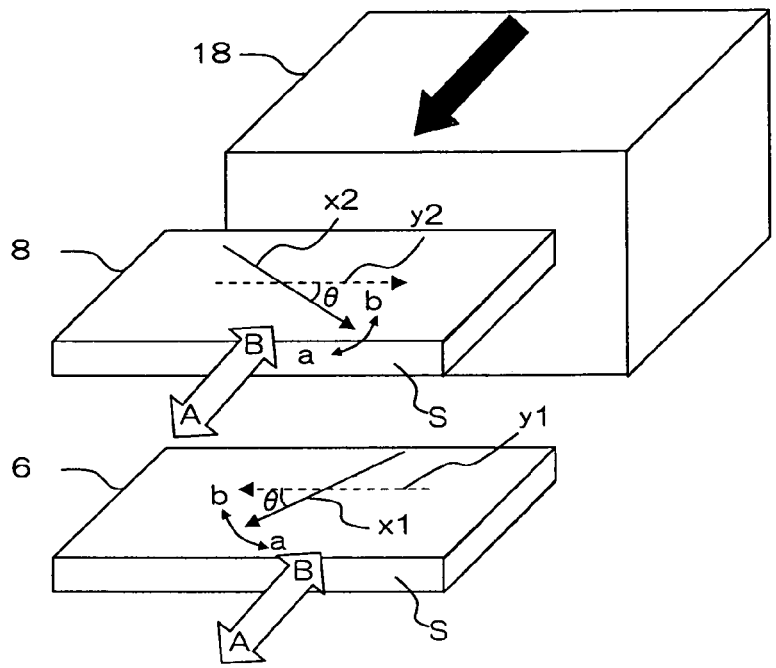
FIG. 4A is a schematic view illustrating operation principles of the thin film magnetic head of the present invention.
Figure 5:
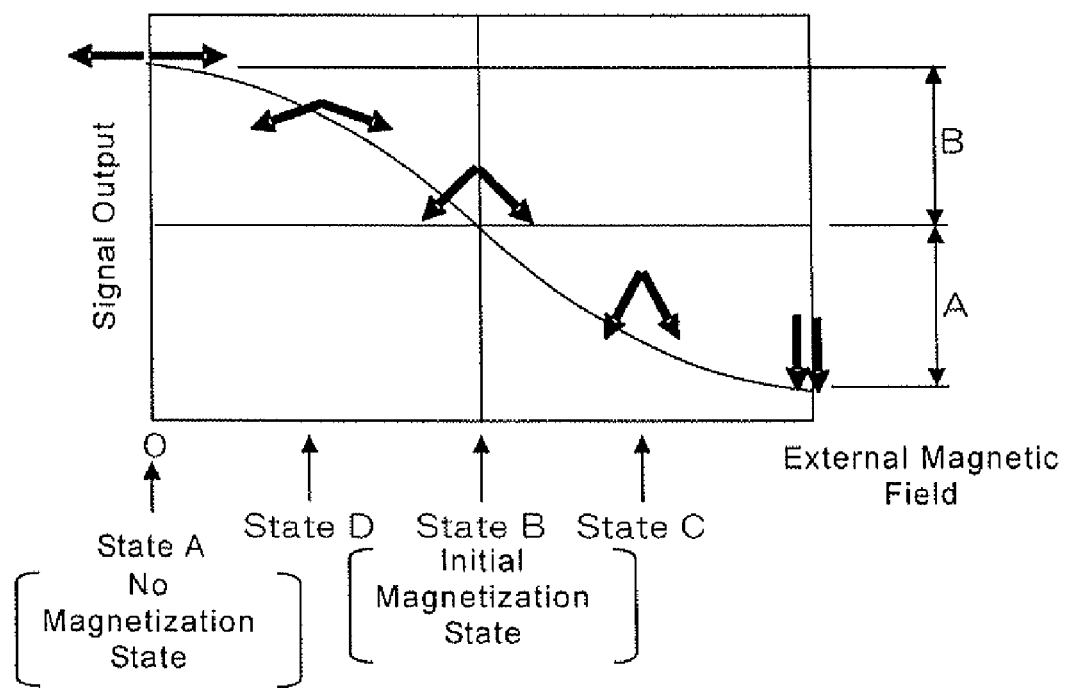
FIG. 5 is a pattern diagram illustrating the relationship between a magnetic field intensity applied to the first and second MR magnetic layers, and the output signal.

Initially, a hypothetical state is assumed neither any of a bias magnetic field nor an external magnetic field is applied. Under the hypothetical state, the first MR magnetic layer 6 is magnetized in the right-pointing direction in FIG. 2A by exchange-coupling with the first exchange-coupling layer 5, and the second MR magnetic layer 8 is magnetized in the left-pointing direction in FIG. 2A by exchange-coupling with the second exchange coupling layer 9. FIG. 4A is a pattern diagram showing magnetizations of the first and second MR magnetic layers. The magnetization directions of the first MR magnetic layer 6 and the second magnetic layer 8 are shown as dashed arrows y1 and y2. FIG. 5 is a pattern diagram showing the relationship between a magnetic field to be applied and an output signal of the reproducing element. The above hypothetical state corresponds to a state A (no magnetization state). In addition, arrows in each state of FIG. 5 schematically show magnetization directions of the two MR magnetic layers 6 and 8.

Actually, since the bias magnetic field application layer 18 is disposed on back sides of the first and second MR magnetic layers 6 and 8, the first and second MR magnetic layers 6 and 8 receive a magnetic field in the orthogonal direction to ABS S as shown with a black bold arrow in FIG. 4A. As a result, the magnetization directions of the first and second MR magnetic layers 6 and 8, as shown by solid arrows x1 and x2 in FIG. 4A, rotate for a predetermined angle θ in reverse rotating directions to each other, and are ideally orthogonally positioned to each other (State B in FIG. 5; initial magnetization state).

In such a state (initial magnetization state), when an external magnetic field is applied as shown by outline arrows in the drawings, the magnetization directions of the first and second MR magnetic layers 6 and 8 respectively rotate in opposite rotating directions according to the external magnetic field direction. Specifically, when the external magnetic field is applied in direction A in the drawing, the magnetization directions (solid arrows x1 and x2) of the first and second MR magnetic layers 6 and 8 rotate in direction "a" in the drawings (State C in FIG. 5). When the external magnetic field is applied in direction B in the drawing, the magnetization directions of the first and second MR magnetic layers 6 and 8 rotate in direction "b" in the drawing (State D in FIG. 5). As described above, the relative angle between the magnetization directions of the first and second MR magnetic layers 6 and 8 changes according to the external magnetic field so that a resistance value of the sense current varies based on a magnetoresistive effect. The thin film magnetic head 1 may detect a direction and strength of the external magnetic field by using this principle.

Figure 4B:
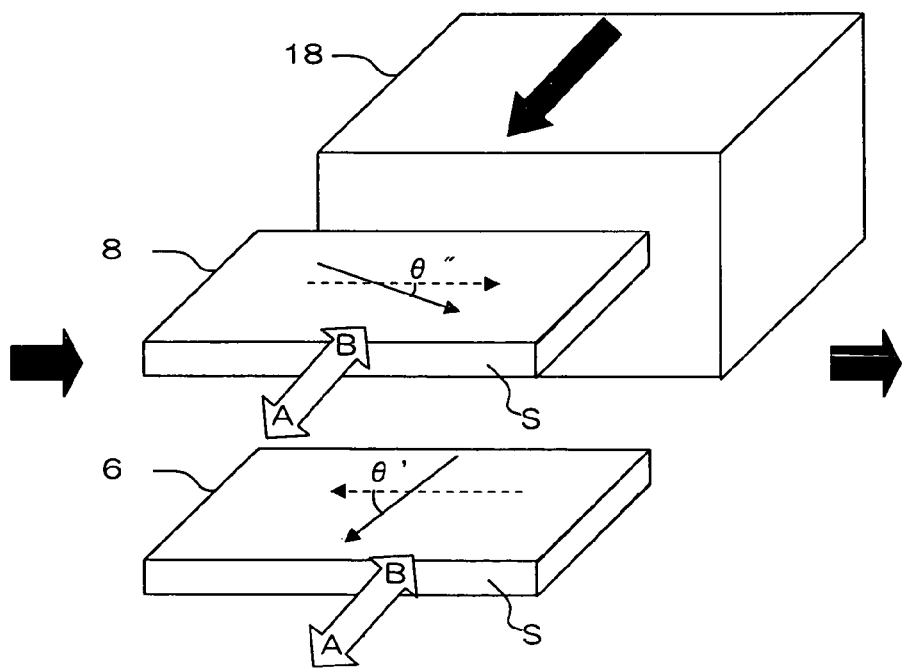
FIG. 4B is a schematic view illustrating a status that the side shield layers have spontaneous magnetization.

FIG. 4B is a pattern diagram as a comparative example showing a status that the side shield layer has the spontaneous magnetization. For example, in the case of an ordinary side shield layer formed by a metal film such as CrTi, the magnetization direction of the side shield layer orients to the track width direction by a shape anisotropy effect at the time when spontaneous magnetization occurs. As shown by lateral arrows in FIG. 4B, when the spontaneous magnetization is in a right-pointing direction, the magnetization directions of the first and second MR magnetic layers 6 and 8 rotate in an anticlockwise direction as a whole by the effect of magnetic field from the side shield layer.

The magnetic direction of the first MR magnetic layer 6 has already rotated in direction A (θ'>θ), and this state is set as the initial magnetization state. Therefore, when the external magnetic field is applied in direction A in the drawings, the magnetization direction of the first MR magnetic layer 6 is readily oriented in direction A by a small external magnetic field, and does not rotate further. On the other hand, since the magnetic direction of the second MR magnetic layer 8 rotates in a direction away from direction A (θ'<θ), when the external magnetic field is applied in direction A in the drawing that is set as the initial magnetization state, the magnetized direction of the MR magnetic layer 8 greatly rotates according to the external magnetic field. When the external magnetic field is applied in direction B in the drawing, the magnetization directions of both the first MR magnetic layer 6 and the second MR magnetic layer 8 greatly rotate according to the external magnetic field. Consequently, considered as a whole, the signal output is rapidly saturated with respect to the external magnetic field in direction A. On the other hand, the signal output is not rapidly saturated with respect to the external magnetic in the direction B. In other words, an asymmetrical relationship between the applied magnetic field and the signal output of reproducing element remarkably exists.

In the present embodiment, an unnecessary magnetic field in the track width from the side shield layer is not applied. Therefore, the magnetic directions of the first and second MR magnetic layers 6 and 8 under state B are generally symmetrically realized with respect to the orthogonal direction to the ABS S as shown in FIG. 4A so that good output symmetry is obtained.

Figure 6A:
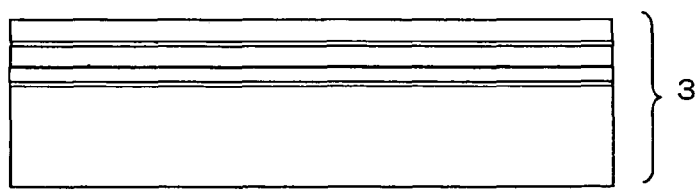
FIGS. 6A to 6E are pattern diagrams illustrating a part of a manufacturing process of the thin film magnetic head of the present invention.
Figure 6B:
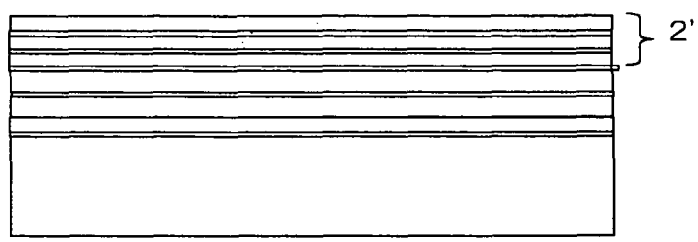
Figure 6C:
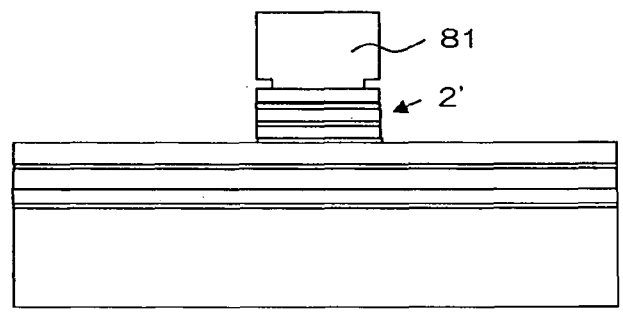
Figure 6D:
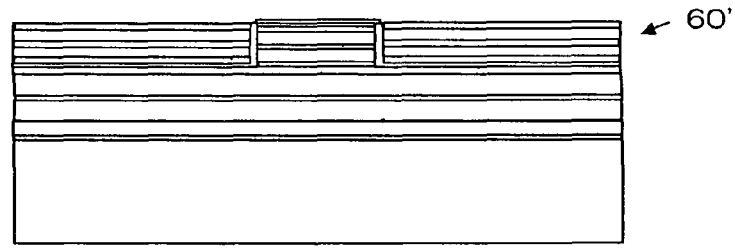
Figure 6E:
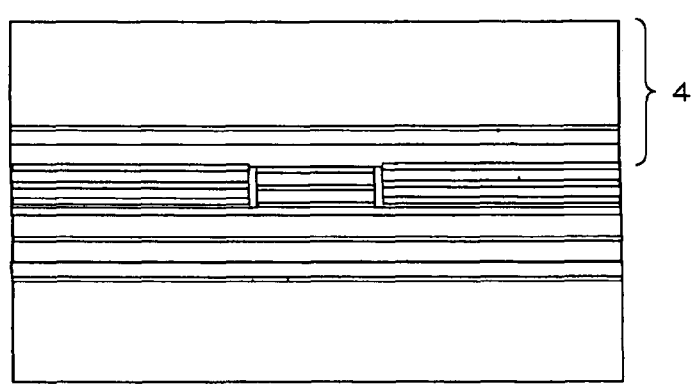

The thin film magnetic head according to the present embodiment may be manufactured by the method described below. Initially, as shown in FIG. 6A, the first shield layer 3 having the layer configuration shown in Table 1 is formed on a substrate. Next, as shown in FIG. 6B, layers 2' configuring the MR stack 2 are formed on the first shield layer 3 by sputtering. Next, as shown in FIG. 6C, a resist 81 is formed, and each of layers 2', configuring the MR stack 2, is patterned using the resist 81 as a mask. Next, as shown in FIG. 6D, each of layers 60', configuring the side shields having the layer configuration shown in Table 2, is formed by ion beam deposition (IBD). The resist 81 is lift-off (removed). Next, a back side of the MR stack 2 is milled using a resist (not shown) as a mask, and the bias magnetic field application layer 18 is formed. Then, the resist is lift-off. Next, as shown in FIG. 6E, the second shield layer 4 with the layer configuration shown in Table. 1 is formed. Then, the writing part 20 described above is formed in the conventional method.

In order to effectively apply the bias magnetic field to the MR magnetic layers 6 and 8, it is preferable that a height of the CoPt layer of the bias magnetic field application layer 18 and heights of the MR magnetic layers 6 and 8 are the same to the extent possible. Therefore, though it depends on layer configuration or layer thickness of each layer, in the present embodiment, as shown in FIG. 2B, each of the layers configuring the MR stack 2 and the first shield layer 3 are milled up to a significant depth. Then, the milled portions are filled with the insulating layer 19 and the bias magnetic field application layer 18 (Cr layer and CoPt layer). As the present embodiment, because the first shield layer 3 is provided with a two layered structure (the intermediate magnetic layer 34 and the first magnetic control layer 36) of the ferromagnetic layers sandwiching the Ru layer 35, the total realized layer thickness of these ferromagnetic layers is thicker. Therefore, even if the first shield layer 3 is deeply milled, the ferromagnetic layers may represent a significant portion of the overall layer thickness, and may maintain their function as a shield. Therefore, considering the manufactured process, it is preferred that the first shield layer 3, not the second shield layer 4, has the two layered structure of the ferromagnetic layer.

In order to form the film configuration shown in FIG. 3B in which the first and second side shield layers directly contact each other, at first, each of the layers that configure the MR stack are patterned according to the above-mentioned method. At this time, as described above, each of the layers is patterned in a trapezoidal shape that has a narrow upper part, a wider lower part, and inclined side slopes. After that, each of the layers configuring the side shield layer is formed by the IBD. In order to certainly form these layers on the inclined side slopes of the MR stack, the IBD is executed at an inclined angle with respect to the film surface orthogonal direction. In the process, when the angle is appropriately determined, it is possible not to form the side shield Ru layer 63 on the inclined side slopes of the MR stack due to the shadow effect of a resist. For example, when each of the layers configuring the side shield layers is formed at an inclined angle with 25° to the film orthogonal direction, the film configuration shown in FIG. 4A is obtained. On the other hand, for example, when the first and second side shield magnetic layers 62 and 64 are formed at an inclined angle with 35° to the film surface orthogonal direction, and the side shield Ru layer 63 is formed at an inclined angle with 5° to the film surface orthogonal direction, the layer configuration shown in FIG. 4B is obtained.

Exemplary Embodiments

The four types of heads shown in Table 3 were produced with the above-described method, and the characteristics of the four heads were compared. The exemplary embodiment 1 is an embodiment that included a DFL as the MR element, and that was provided with the side shield layer (see FIG. 4A) in which a Ru layer extended to the vicinity of the MR stack. The exemplary embodiment 2 is an embodiment that included a DFL as the MR element, and that was provided with the side shield layer (see FIG. 4B) that had no Ru layer in the vicinity of the MR stack (absence of Ru film). The comparative embodiment 1 is an embodiment that used a TMR type spin-valve as the MR element, and in which the side shield layers were not provided. The film configuration of the spin-valve according to the comparative example 1 is shown in Table 4. The width of the read gap according to the comparative embodiment 1 was 27.3 nm. The comparative embodiment 2 is an embodiment that included a DFL as the MR element, and in which the side shield layers were not provided. In the comparative embodiments 1 and 2, parts corresponding to the side shield layers of the exemplary embodiments 1 and 2 were all substituted with Ru.

TABLE 3

| | MR Element | Side Shield Layer | TAA (mV) | Resolution Capacity (%) | MRWu50/ MRWu10 (%) | Asymmetry Standard Deviation (%) |
|---|---|---|---|---|---|---|
| Comparative Embodiment 1 | Spin Valve (TMR) | N/A | 14 | 45 | 52 | 10 |
| Comparative Embodiment 2 | DFL | N/A | 14 | 48 | 52 | 10 |

TABLE 3-continued

| MR Element | Side Shield Layer | TAA (mV) | Resolution Capacity (%) | MRWu50/ MRWu10 (%) | Asymmetry Standard Deviation (%) |
|---|---|---|---|---|---|
| Exemplary Embodiment 1 | DFL | Ru Extending Film | 14 | 48 | 60 | 10 |
| Exemplary Embodiment 2 | DFL | Absence of Ru Film | 14 | 48 | 60 | 8 |

TABLE 4

| Layer Configuration | Composition | Film Thickness (nm) |
|---|---|---|
| Cap Layer | Ta | 2 |
|  | Ru | 1 |
| Free Layer | NiFe | 3 |
|  | CoFeB | 1 |
|  | $Co_{30}Fe_{70}$ | 1 |
| Nonmagnetic Intermediate Layer | MgO | 3 |
| Second Pinned Layer | $Co_{30}Fe_{70}$ | 1 |
|  | CoFeB | 1.5 |
| Nonmagnetic Intermediate Layer | Ru | 0.8 |
| First Pinned Layer | $Co_{70}Fe_{30}$ | 3 |
| Antiferromagnetic Layer | IrMn | 7 |
| Buffer Layer | Ru | 2 |
|  | Ta | 1 |

Electromagnetic conversion characteristics according to the test samples that were obtained by the above described comparison were evaluated. Initially, a reproducing output (track average amplitude: TAA) of an isolated reproducing waveform was measured. In all the embodiments, the reproducing output (TAA) of 14 mV was obtained, and no difference among the embodiments occurred. The result is understood because the MgO layer was used as a nonmagnetic intermediate layer in all the embodiments, and because the film configurations of the layers were the same. Herein, the layers affected magnetoresistive changes around the MgO layer (the first and second MR magnetic layers, the free layer, the second pinned layer).

Next, resolution capacities were compared. The resolution capacities were evaluated based on a frequency dependency of the reproducing output (TAA). The resolution capacity was defined as an output of a high frequency divided by an output of the isolated reproducing waveform, and the frequency was set 190 MHz. The value of the comparative embodiment 1 was 45%. On the other hand, the values of the comparative embodiment 2 and the exemplary embodiments 1 and 2 were 48%. This is because the comparative embodiment 2 and the exemplary embodiments 1 and 2 adopted the DFL, and the adoption of DFL narrows the read gap. At the result, it is understood that higher resolution capacities were obtained compared to the comparative embodiment 1.

Figure 7:
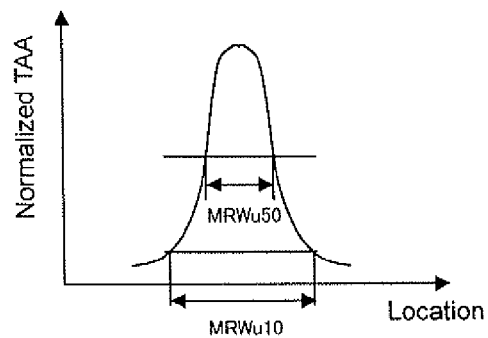
FIG. 7 is a pattern diagram illustrating a definition of MRWu50/MRWu10.

Next, effects of the side shield layer were evaluated. Generally, a graph, as shown in FIG. 7, was obtained when relationships between a position of the head and the reproducing output of the isolated reproducing waveform (TAA) was found with the head scanning in the track crossing direction. In the graph, MRWu10 means a track width indicating an output of 10%, and MRWu50 means a track width indicating an output of 50%. When the value of MRWu50/MRWu10 is large, the value means that the bottom part of the curved line does not spread. In other word, when the value of MRWu50/ MRWu10 is large, it means that the effect of the side shield is found. The values of MRWu50/MRWu10 of the comparative embodiments 1 and 2 that did not have side shields were 52%, however, the values of MRWu50/MRWu10 of the exemplary embodiments 1 and 2 that the side shield layers were disposed increased to 60%. This is understood as a significant effect of the side shield layers.

Next, a nonlinearity (asymmetry) between a magnetic field and an output was evaluated. The asymmetry was defined as a ratio of an output in a positive side by an output in a negative side with respect to a quasi static test (QST) waveform. Namely, the asymmetry was defined as B/A where the B and the A were used from FIG. 4A. When the side shield generated a magnetic field, the average value of the asymmetry would move either to the positive side or to the negative side, and that would cause an increase in dispersion of the asymmetry. As the exemplary embodiment 2 shows, when the side shield Ru layer did not extend to near the MR stack (no Ru layer in the vicinity of the MR stack), the dispersion of the asymmetry was restrained. This is understood, as described above, based on the following reasons. The magnetic field generated by the spontaneous magnetization in the side shield was sealed inside the side shield so that the magnetization did not influence the magnetic field. Consequently, as shown in FIG. 4A, a curved line having good asymmetry was obtained.

Figure 8:
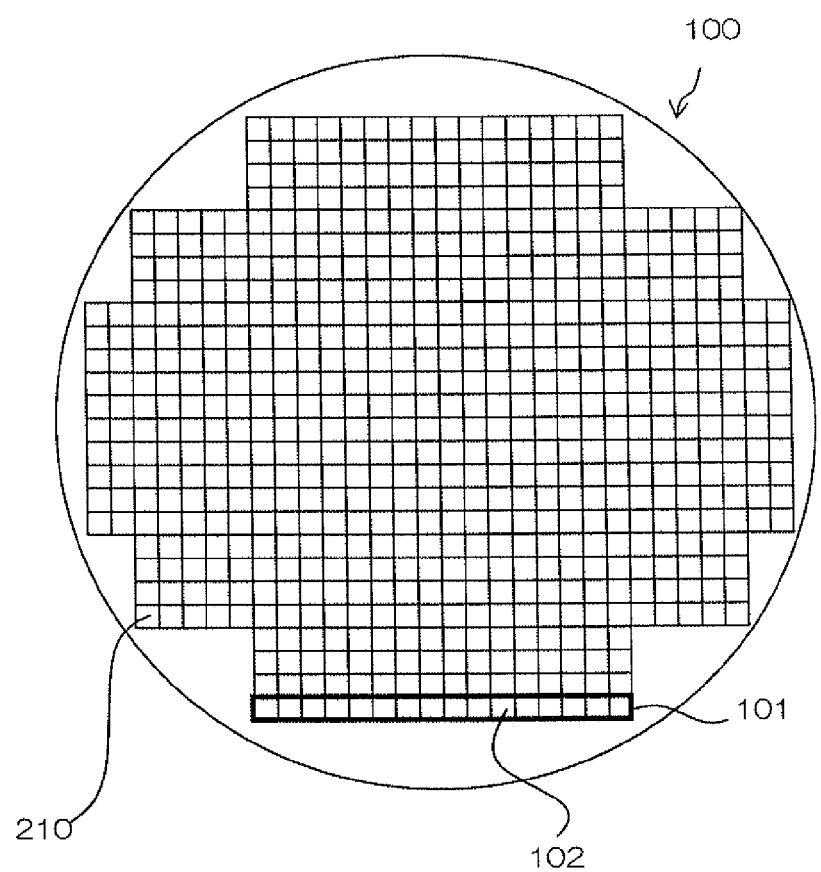
FIG. 8 is a top plan view of a wafer according to manufacturing of the thin film magnetic head of the present invention.

Finally, a wafer used for manufacturing the above mentioned thin film magnetic head is described below. As shown in FIG. 8, on a wafer 100 is formed on a stack (laminated body) 102 configuring the above mentioned thin film magnetic head. The wafer 100 is divided into a plurality of bars 101, which are work units for polishing the ABS S. After polishing, the bar 101 is cut, and is divided into sliders 210 each containing a thin film magnetic head. The wafer 100 is disposed with cutting margins (not shown) used for cutting the wafer 100 into the bars 101 and the bars 101 into the sliders 210.

Figure 9:
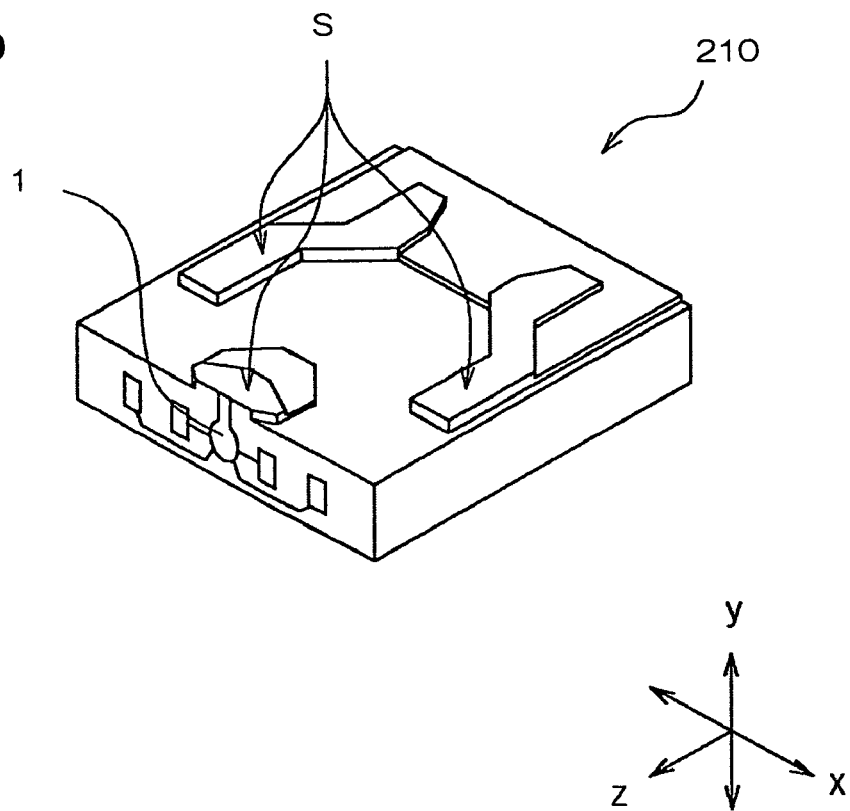
FIG. 9 is a perspective view of a slider of the present invention.

As shown in FIG. 9, the slider 210 is substantially hexahedron-shaped. One face thereof is the ABS S that faces a hard disk.

Figure 10:
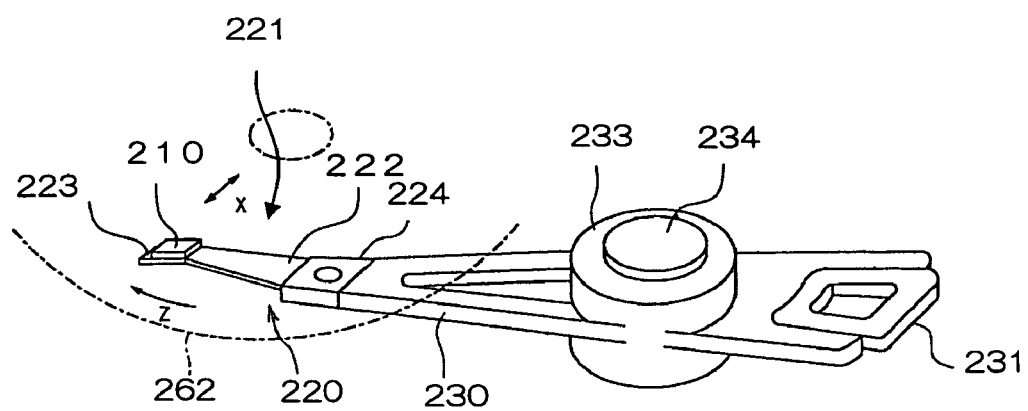
FIG. 10 is a perspective view of a head arm assembly that includes a head gimbal assembly assembled with the slider of the present invention.

As shown in FIG. 10, a head gimbal assembly 220 includes the slider 210 and a suspension 221 for elastically supporting the slider 210. The suspension 221 includes a spring-set load beam 222 made of stainless steel, a flexure 223 disposed on one edge of the load beam 222 and a base plate 224 disposed on the other edge of the load beams 222. The flexure 223 is disposed to contact with the slider 210, giving a proper degree of freedom to the slider 210. On the section in which the slider 210 is mounted on the flexure 223, a gimbal part is provided for constantly keeping the position of the slider 210.

The slider 210 is placed inside a hard disk device, facing a hard disk, which is a disk-shaped recording medium to be rotated. At a time when a hard disk is rotated in the z-direction in FIG. 10, airflow passing through the space between the hard disk and the slider 210 occurs lift force for the slider 210 downward in the y-direction. The slider 210 is moved away from the surface of the hard disk by the lift force. The thin film magnetic head 1 is formed in the area near the edge portion on the air exit side (i.e., the edge portion on the lower left side in FIG. 9) of the slider 210.

The portion in which the head gimbal assembly 220 is mounted on an arm 230 is referred to as a head arm assembly 221. The arm 230 allows moving the slider 210 in the x-direction crossing the track of the hard disk 262. One edge of the arm 230 is mounted on the base plate 224. On the other edge of the arm 230, a coil 231 is mounted, which constitutes part of the voice coil motor. A bearing part 233 is disposed in the middle section of the arm 230. The arm 230 is rotatably supported by a shaft 234 mounted on the bearing part 233. The arm 230 and the voice coil motor for driving the arm 230 constitute an actuator.

Figure 11:
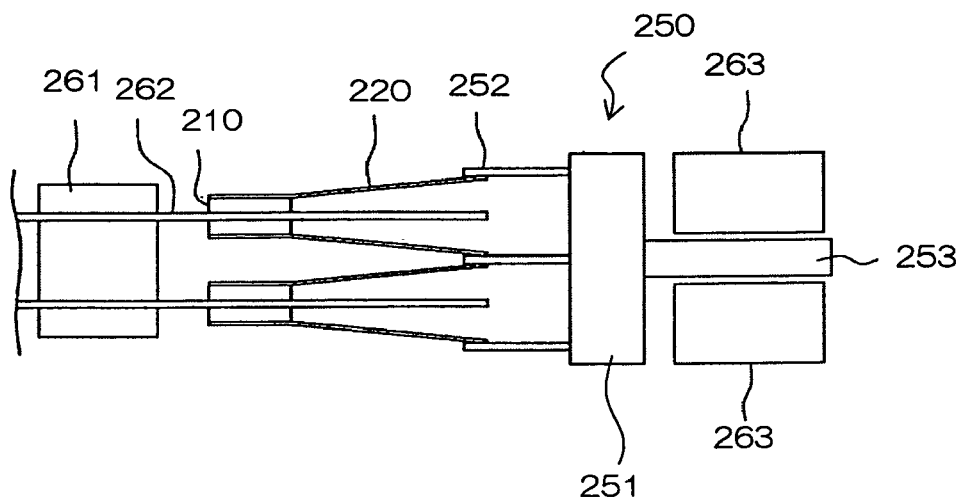
FIG. 11 is a side view of the head arm assembly assembled with the slider according to the present invention.
Figure 12:
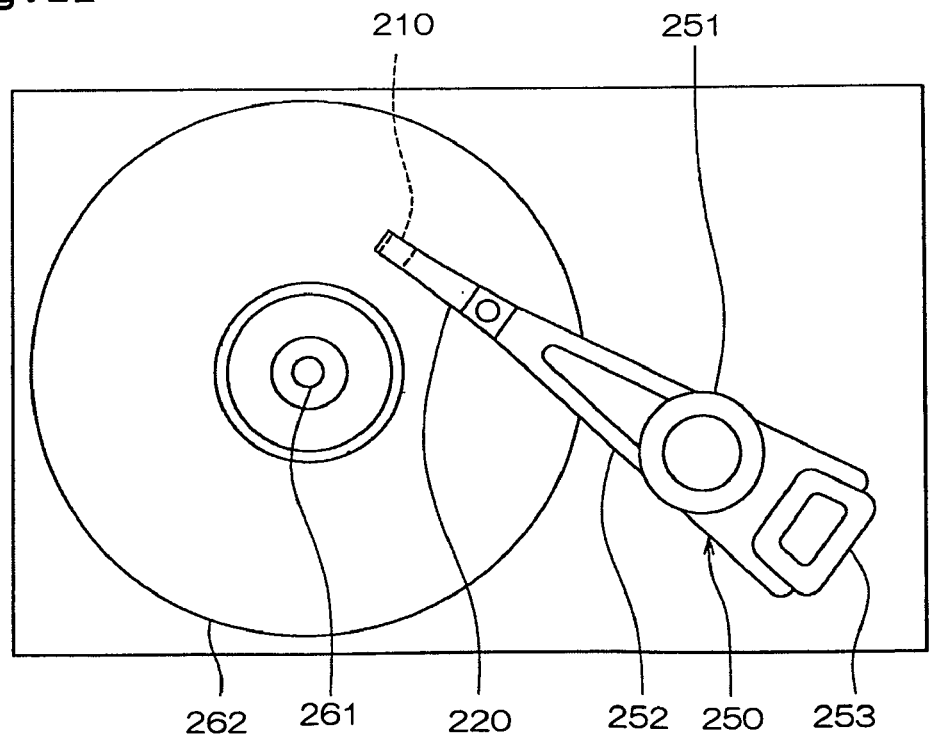
FIG. 12 is a top plan view of a hard disk device assembled with the slider of the present invention.

Next, descriptions of a head stack assembly into which the above-mentioned slider is integrated and of a hard disk device are given below with reference to FIG. 11 and FIG. 12. The head stack assembly includes a carriage having a plurality of arms, wherein a head gimbal assembly 220 is mounted on each arm. FIG. 11 is a side view of the head stack assembly. FIG. 12 is a top plan view of a hard disk device. The head stack assembly 250 includes a carriage 251 having a plurality of arms 252. On each arm 252, head gimbal assemblies 220 are mounted at an interval in the vertical direction. On the side of the carriage 251 opposite to the arm 252, the coil 253 is mounted, which constitutes part of a voice coil motor. The voice coil motor has permanent magnets 263 disposed facing each other on both sides of the coil 253.

As shown in FIG. 12, the head stack assembly 250 is integrated into the hard disk device. The hard disk device has multiple hard disks 262 mounted on a spindle motor 261. For each hard disk 262, two sliders 210 are disposed facing each other on both sides of the hard disk 262. The head stack assembly 250, excluding the slider 210, and an actuator, which correspond to the positioning device according to the present invention, not only supports the slider 210 but also positions the slider 210 with respect to the hard disk 262. The slider 210 is moved in the direction crossing the track of the hard disk 262 by means of the actuator to be positioned with respect to the hard disk 262. The thin film magnetic head 1 of the slider 210 records information on the hard disk 262 by means of a writing head and reproduces information recorded on the hard disk 262 by means of a reading head.

A description of the preferred embodiment according to the present invention was given above in detail. However, it should be appreciated that a wide variety of alterations and modifications are possible as far as they do not depart from the spirit and scope of the attached claims.

What is claimed is:

1. A thin film magnetic head comprising:
a magnetoresistive (MR) stack having first and second magnetoresistive (MR) magnetic layers whose magnetization directions change according to an external magnetic field, and a nonmagnetic intermediate layer disposed between and with contacting the first and second MR magnetic layers;
first and second shield layers that function as electrodes supplying a sense current to the MR stack in a current perpendicular to plate (CPP) direction, the first and second shield layers being disposed on a first side and on a second side of the MR stack, respectively, as seen in the CPP direction, wherein
the first shield layer faces the first MR magnetic layer, and has a first magnetic control layer disposed at a surface where the first shield layer faces the first MR magnetic layer, the first magnetic control layer having a magnetization direction fixed to a first direction that is parallel to an air bearing surface (ABS);
the second shield layer faces the second MR magnetic layer, and has a second magnetic control layer disposed at a surface where the second shield layer faces the second MR magnetic layer, the second magnetic control layer having a magnetization direction fixed to another direction that is antiparallel to the first direction;
a first exchange-coupling layer that is positioned between the first MR magnetic layer and the first magnetic control layer, and that generates an exchange-coupling between the first MR magnetic layer and the first magnetic control layer;
a second exchange-coupling layer that is positioned between the second MR magnetic layer and the second magnetic control layer, and that generates an exchange-coupling between the second MR magnetic layer and the second magnetic control layer;
a bias magnetic field application layer that is disposed at a surface of the MR stack, the surface being on a back side of the MR stack, as seen from and in a direction perpendicular to the ABS, and that applies a bias magnetic field to the MR stack in a direction orthogonal to the ABS; and
a pair of side shield layers that are positioned on a third side and on a fourth side of the MR stack, respectively, as seen in a track width direction, wherein
each of the side shield layers includes a pair of side shield magnetic layers that are antimagnetically exchange-coupled through a side shield ruthenium layer.

2. The thin film magnetic head according to claim 1, wherein the side shield magnetic layers directly contact each other in a vicinity of the MR stack where the side shield ruthenium layer is not present.

3. The thin film magnetic head according to claim 1, wherein the each of the side shield magnetic layers includes a soft magnetic layer and a CoFe layer that contacts the side shield ruthenium layer.

4. The thin film magnetic head according to claim 1, wherein the soft magnetic layer is either a NiFe layer or a CoZrTa layer.

5. The thin film magnetic head according to claim 1, wherein the first and second exchange-coupling layers are configured with a ruthenium layer of 0.8 nm in a film thickness.

6. The thin film magnetic head according to claim 1, wherein the first and second exchange-coupling layers are magnetic layers that are configured with a plurality of layers and that include at least a ruthenium layer of 0.8 nm in a film thickness among the plurality of layers.

7. The thin film magnetic head according to claim 1, wherein
the first shield layer includes a first antiferromagnetic layer, an intermediate magnetic layer that is exchange-coupled with the first antiferromagnetic layer, and a ruthenium layer that is positioned between the intermediate magnetic layer and the first magnetic control layer and that exchange-couples the intermediate magnetic layer with the first magnetic control layer, and
the second shield layer includes a second antiferromagnetic layer that is exchange-coupled with the second magnetic control layer.

8. A slider equipped with the thin film magnetic head according to claim 1.

9. A head gimbal assembly comprising
the slider according to claim 8 and
a suspension that elastically supports the slider.

10. A hard disk device comprising
the slider according claim 8 and
a device that supports the slider and positions the slider with respect to a recording medium.

11. A wafer on which a laminated structure is formed, the laminated structure being configured as the thin film magnetic head according to claim 1.

12. A thin film magnetic head comprising:
- a magnetoresistive (MR) stack having first and second magnetoresistive (MR) magnetic layers whose magnetization directions change according to an external magnetic field, and a nonmagnetic intermediate layer disposed between and with contacting the first and second MR magnetic layers;
- first and second shield layers that function as electrodes supplying a sense current to the MR stack in a direction orthogonal to a laminating direction of the MR stack, the MR stack being disposed between the first shield layer and the second shield layer in the direction orthogonal to the laminating direction, wherein
  - the first shield layer faces the first MR magnetic layer, and has a first magnetic control layer disposed at a surface where the first shield layer faces the first MR magnetic layer, the first magnetic control layer having a magnetization direction fixed to a first direction that is parallel to an air bearing surface (ABS);
  - the second shield layer faces the second MR magnetic layer, and has a second magnetic control layer disposed at a surface where the second shield layer faces the second MR magnetic layer, the second magnetic control layer having a magnetization direction fixed to another direction that is antiparallel to the first direction;
- a first exchange-coupling layer that is positioned between the first MR magnetic layer and the first magnetic control layer, and that generates an exchange-coupling between the first MR magnetic layer and the first magnetic control layer;
- a second exchange-coupling layer that is positioned between the second MR magnetic layer and the second magnetic control layer, and that generates an exchange-coupling between the second MR magnetic layer and the second magnetic control layer;
- a bias magnetic field application layer that is disposed at an opposite surface of the MR stack from the ABS, and that applies a bias magnetic field to the MR stack in a direction orthogonal to the ABS; and
- a pair of side shield layers that are positioned at both sides of the MR stack with respect to a track width direction, wherein
- each of the side shield layers includes a pair of side shield magnetic layers that are antimagnetically exchange-coupled through a side shield ruthenium layer,
- the first shield layer includes a first antiferromagnetic layer, an intermediate magnetic layer that is exchange-coupled with the first antiferromagnetic layer, and a ruthenium layer that is positioned between the intermediate magnetic layer and the first magnetic control layer and that exchange-couples the intermediate magnetic layer with the first magnetic control layer, and
- the second shield layer includes a second antiferromagnetic layer that is exchange-coupled with the second magnetic control layer.

* * * * *